US007756709B2

(12) United States Patent
Gierach

(10) Patent No.: US 7,756,709 B2
(45) Date of Patent: Jul. 13, 2010

(54) DETECTION OF VOICE INACTIVITY WITHIN A SOUND STREAM

(75) Inventor: Karl D. Gierach, Irvine, CA (US)

(73) Assignee: Applied Voice & Speech Technologies, Inc., Foothill Ranch, CA (US)

( * ) Notice: Subject to any disclaimer, the term of this patent is extended or adjusted under 35 U.S.C. 154(b) by 1750 days.

(21) Appl. No.: 10/770,748

(22) Filed: Feb. 2, 2004

(65) Prior Publication Data

US 2005/0171768 A1 Aug. 4, 2005

(51) Int. Cl.
*G10L 15/04* (2006.01)

(52) U.S. Cl. ....................... 704/253; 704/208; 704/246; 704/254

(58) Field of Classification Search ................. 704/231, 704/246, 208, 251, 253, 254
See application file for complete search history.

(56) References Cited

U.S. PATENT DOCUMENTS 4,092,493 A 5/1978 Rabiner et al.

(Continued)

OTHER PUBLICATIONS

Jacobs et al. Silence Detection for Multimedia Comunication Systems, Columbia University, NY, NY 10027, Apr. 13, 1997.

(Continued)

*Primary Examiner*—Richemond Dorvil
*Assistant Examiner*—Leonard Saint Cyr
(74) *Attorney, Agent, or Firm*—Anatoly S. Weiser, Esq.

(57) ABSTRACT

A method for identifying end of voiced speech within an audio stream of a noisy environment employs a speech discriminator. The discriminator analyzes each window of the audio stream, producing an output corresponding to the window. The output is used to classify the window in one of several classes, for example, (1) speech, (2) silence, or (3) noise. A state machine processes the window classifications, incrementing counters as each window is classified: speech counter for speech windows, silence counter for silence, and noise counter for noise. If the speech counter indicates a predefined number of windows, the state machine clears all counters. Otherwise, the state machine appropriately weights the values in the silence and noise counters, adds the weighted values, and compares the sum to a limit imposed on the number of non-voice windows. When the non-voice limit is reached, the state machine terminates processing of the audio stream.

27 Claims, 4 Drawing Sheets

U.S. PATENT DOCUMENTS

| | | | | |
|---|---|---|---|---|
| 4,624,008 | A * | 11/1986 | Vensko et al. | 704/253 |
| 4,829,578 | A * | 5/1989 | Roberts | 704/233 |
| 4,959,865 | A | 9/1990 | Stettiner et al. | |
| 5,371,787 | A * | 12/1994 | Hamilton | 379/386 |
| 5,651,094 | A * | 7/1997 | Takagi et al. | 704/244 |
| 5,978,756 | A | 11/1999 | Walker et al. | |
| 6,249,757 | B1 * | 6/2001 | Cason | 704/214 |
| 6,381,568 | B1 * | 4/2002 | Supplee et al. | 704/210 |
| 6,535,844 | B1 | 3/2003 | Wood et al. | |
| 6,567,503 | B2 * | 5/2003 | Engelke et al. | 379/52 |
| 6,570,991 | B1 * | 5/2003 | Scheirer et al. | 381/110 |
| 6,782,363 | B2 * | 8/2004 | Lee et al. | 704/248 |
| 6,889,187 | B2 * | 5/2005 | Zhang | 704/253 |
| 7,162,415 | B2 * | 1/2007 | Holzrichter et al. | 704/201 |
| 7,180,892 | B1 * | 2/2007 | Tackin | 370/389 |
| 7,231,348 | B1 * | 6/2007 | Gao et al. | 704/233 |
| 7,277,853 | B1 * | 10/2007 | Bou-Ghazale et al. | 704/248 |
| 2002/0188442 | A1 * | 12/2002 | Gass et al. | 704/208 |
| 2002/0198704 | A1 * | 12/2002 | Rajan et al. | 704/214 |
| 2003/0055639 | A1 * | 3/2003 | Rees | 704/233 |
| 2003/0088622 | A1 | 5/2003 | Hwang et al. | |
| 2004/0052338 | A1 * | 3/2004 | Celi et al. | 379/88.16 |
| 2004/0064314 | A1 * | 4/2004 | Aubert et al. | 704/233 |

OTHER PUBLICATIONS

Wendt & Petropulu, Pitch Determination and Speech Segmentation Using The Discrete Wavelet Transform, Drexel University, Philadelphia, PA 19104.

Herrera et al., Speech Detection in High Noise Conditions, Universidad National Autonoma de Mexico, Circuito Exterior, C. U. Mexico 04510 D.F. Ap. Postal 70256, pp. 1774-1778.

Tchorz & Kollmeier, Speech Detection and SNR Prediction Basing on Amplitude Modulation Pattern Recognition, AG Medizinische Physik, Univ. Oldenburg, 26111 Oldenburg, Germany.

Kuo & Huang, Implementation of Optimized Spectral Subtraction Techniques on TMS320C5x and TMS320C3x, Northern Illinois University, Dekalb, IL 60115, pp. 20-24.

Shin et al., Speech/Non-Speech Classification Using Multiple Features for Robust Endpoint Detection, Information Tech. Lab., LG Corporate Institute of Technology.

Tchorz & Kollmeier, Autom. Classification of the Acoustical Situation Using Amplitude Modulation Spectrograms, AG Medizinische Physik, Univ Oldenburg, 26111 Oldenburg, Germany.

Vizinho et al., Missing Data Theory, Spectral Subtraction & Signal-to-Noise Estim. For Robust ASR, Univ. of Sheffield, Regent Court, 211 Portobello St., Sheffield S1 4DP, UK.

Bruce Lowerre, Endpointer Algorithm, 1995, 1997.

* cited by examiner

DETECTION OF VOICE INACTIVITY WITHIN A SOUND STREAM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

COMPUTER PROGRAM LISTING APPENDIX

Two compact discs (CDs) are being filed with this document. They are identical. Their content is hereby incorporated by reference as if fully set forth herein. Each CD contains files listing header information or code used in embodiments of an end-of-speech detector in accordance with the present invention. The following is a listing of the files included on each CD, including their names, sizes, and dates of creation:

```
Volume in drive D is 040130_1747
Volume Serial Number is 1F36-4BEC
Directory of D:\
01/30/2004 05:47 PM <DIR>      CodeFiles
01/30/2004 05:47 PM <DIR>      HeaderFiles
      0 File(s)      0 bytes
Directory of D:\CodeFiles
01/30/2004 05:47 PM <DIR>      .
01/30/2004 05:47 PM <DIR>      ..
01/30/2004 05:42 PM      16,734 ZeroCrossingEnergyFilter1.cpp
01/30/2004 05:43 PM      17,556 ZeroCrossingEnergyFilter2.cpp
      2 File(s)      34,290 bytes
Directory of D:\HeaderFiles
01/30/2004 05:47 PM <DIR>      .
01/30/2004 05:47 PM <DIR>      ..
01/30/2004 05:41 PM      2,325 ZeroCrossingEnergyFilter1.h
01/30/2004 05:42 PM      2,471 ZeroCrossingEnergyFilter2.h
      2 File(s)      4,796 bytes
Total Files Listed:
      4 File(s)      39,086 bytes
      6 Dir(s)      0 bytes free
```

FIELD OF THE INVENTION

The present invention relates generally to sound processing, and, more particularly, to detecting cessation of speech activity within an electronic signal representing speech.

BACKGROUND

Voice processing, storage, and transmission often require identification of periods of silence. In a telephone answering system, for example, it may be necessary to determine when a caller stops talking in order to offer the caller additional options, to hang up on the caller, or to delimit a segment of the caller's speech before sending the speech segment to a voice (speech) recognition processor. As another example, consider the use of a speakerphone or similar multi-party conferencing equipment. Silence has to be detected so that the speakerphone can switch from a mode in which it receives audio signals from a remote caller and reproduces them to the local caller, to a mode in which the speakerphone receives sounds from the local caller and sends the sounds to the remote caller, and vice versa. Silence detection is also useful when compressing speech before storing it, or before transmitting the speech to a remote location. Because silence generally carries no useful information, a predetermined symbol or token can be substituted for each silence period. Such substitution saves storage space and transmission bandwidth. When lengths of the silent periods need to be preserved during reproduction—as may be the case when it is desirable to reproduce the speech authentically, including meaningful pauses—each token can include an indication of duration of the corresponding silent period. Generally, the savings in storage space or transmission bandwidth are little affected by accompanying silence tokens with indications of duration of the periods of silence.

In an ideal environment, a silence detector can simply look at the energy content or amplitude of the audio signal. Indeed, many silence detection methods often rely on energy or amplitude comparisons of the signal to one or more thresholds. The comparison can be performed on either broadband or band-limited signal. Ideal environments, however, are hard to come by: noise is practically omnipresent. Noise makes simple energy detection methods less reliable because it becomes difficult to distinguish between low-level speech and noise, particularly loud noise. Proliferation of mobile communication equipment—cellular telephones —has aggravated this problem, because telephone calls originating from cellular telephones tend to be made from noisy environments, such as automobiles, streets, and shopping malls. Engineers have therefore looked at other sound characteristics to distinguish between "noisy" silence and speech.

One characteristic helpful in identifying periods of silence is the average number of signal zero crossings in a given time period, also known as zero-crossing rate. A zero crossing takes place when the signal's waveform crosses the time axis. Zero-crossing rate is a relatively good spectral measure for narrowband signals. While speech energy is concentrated at low frequencies, e.g., below about 2.5 KHz, noise energy resides predominantly at higher frequencies. Although speech cannot be strictly characterized as narrowband signal, low zero-crossing rate has been observed to correlate well with voiced speech, and high zero-crossing rate has been observed to correlate well with noise. Consequently, some systems rely on zero-crossing rate algorithms to detect silence. For a fuller description of the use of zero-crossing algorithms in silence detection, see LAWRENCE R. RABINER & RONALD W. SCHAFER, DIGITAL PROCESSING OF SPEECH SIGNALS 130-35 (1978).

Other systems combine energy detection with zero-crossing algorithm. Still other systems use different spectral measures, either alone or in combination with monitoring signal energy and amplitude characteristics. But whatever the nature of the specific silence detector implementation, it generally reflects some compromise, minimizing either the probability of non-detection of silence, or the probability of false detection of silence. None appears to be a perfect replacement for human ear and judgment.

In many applications, reliable and robust detection of silence is an important performance parameter. In a telephone answering system, for example, it is important not to cut off a caller prematurely, but to allow the caller to leave a complete message and exercise other options made available by the answering system. False silence detection can lead to prematurely dropped telephone calls, resulting in loss of sales, loss of goodwill, missed appointments, embarrassment, and other undesirable consequences.

A need thus exists for reliable and robust silence detection methods and silence detectors. Another need exists for telephone answering systems with reliable and robust silence detectors. A further need exists for voice recognition and other voice processing systems with improved silence detectors.

SUMMARY

The present invention is directed to methods, apparatus, and articles of manufacture that satisfy one or more of these needs. In one exemplary embodiment, the invention herein disclosed is a method of identifying and delimiting (e.g., marking) end-of-speech within an audio stream. According to this method, audio stream is received in blocks, for example, digitized blocks of a telephone call received from a computer telephony subsystem. The blocks are segmented into windows, for example, overlapping windows. Each window is analyzed in a speech discriminator, which may observe the sound energy within the window, spectral distribution of the energy, zero crossings of the signal, or other attributes of the sound. Based on the output of the speech discriminator, a classification is assigned to the window. The classification is selected from a classification set that includes a first classification label corresponding to presence of speech within the window, and one or more classification labels corresponding to absence of speech in the window. If the window is assigned the first classification label, a speech counter is incremented; if the window is assigned one of the classification labels corresponding to absence of speech (e.g., silence or noise), a non-voice counter is incremented. If the speech counter exceeds a first limit, both the speech counter and the non-voice counter are cleared. When the non-voice counter reaches a second limit, end-of-speech within the audio stream is identified, and processing of the audio stream (e.g., recording of the telephone call) is terminated.

In another exemplary embodiment, an audio stream is also received in blocks, segmented into windows, and each window is analyzed in a speech discriminator and assigned a classification based on the output of the speech discriminator. Here, the classification is selected from a classification set that includes a first classification label corresponding to presence of speech within the window, a second classification label corresponding to silence, and a third classification label corresponding to noise. Depending on the classification of the window, a speech, silence, or noise counter is incremented: the speech counter is incremented in case of the first classification label, the silence counter is incremented in case of the second classification label, and the noise counter is incremented in case of the third classification label. All the counters are cleared when the speech counter exceeds a first limit. Otherwise, the values stored in the silence and noise counters are weighted. For example, the value in the silence counter can be assigned twice the weight assigned to the value stored in the noise counter. The weighted values in the noise and silence counters are then combined, for example, summed, and the result (sum) is compared to a second limit. End-of-speech within the audio stream is identified when the result reaches the second limit. Recording or other processing of the audio stream is then terminated.

These and other features and aspects of the present invention will be better understood with reference to the following description, drawings, and appended claims.

DETAILED DESCRIPTION

Figure 1:
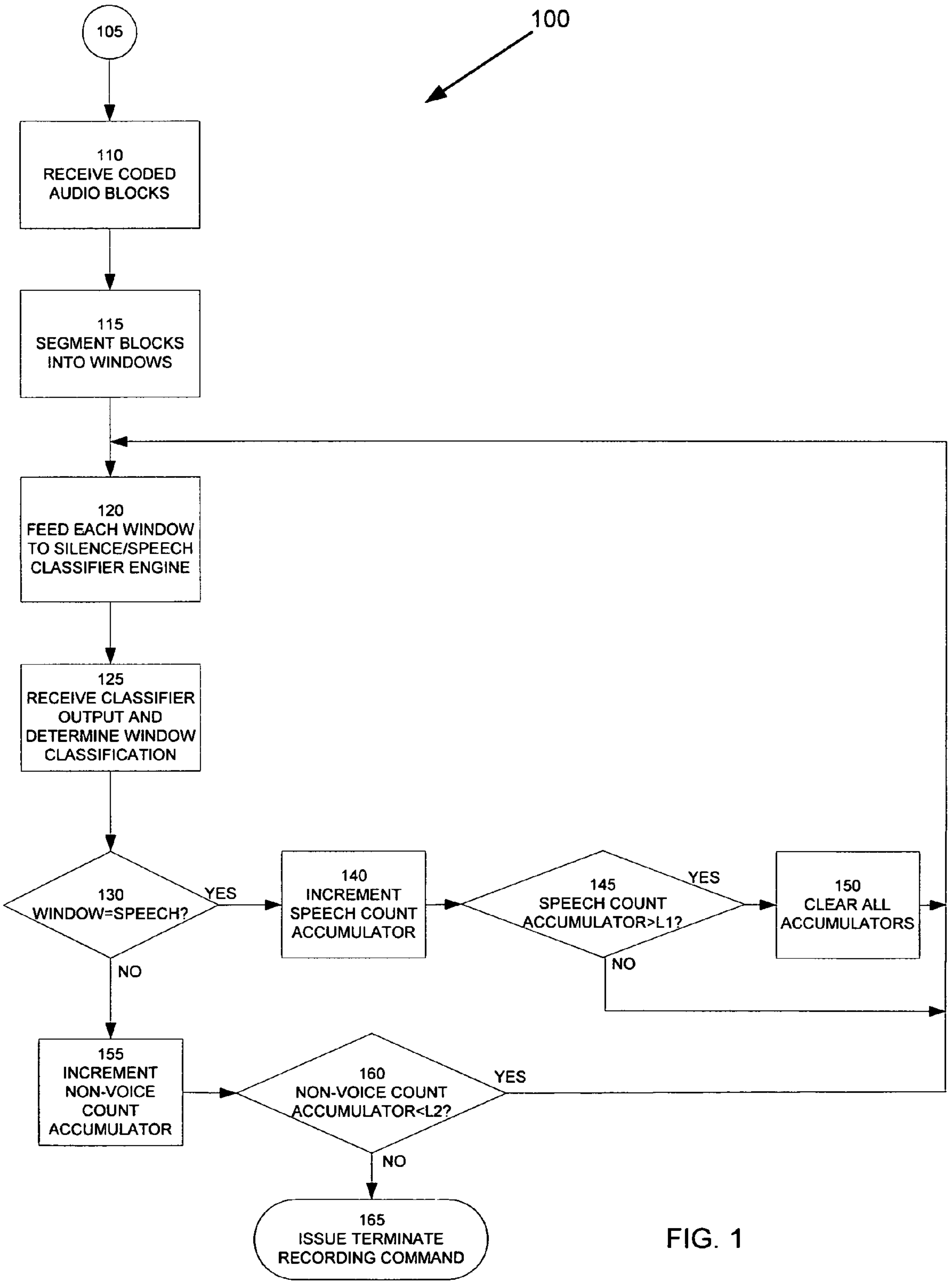
FIG. 1 is a high-level flow chart of selected steps of a process for identifying a period of silence within an audio stream and terminating voice recording, in accordance with the present invention.

Reference will now be made in detail to several embodiments of the invention that are illustrated in the accompanying drawings. Wherever possible, same or similar reference numerals are used in the drawings and the description to refer to the same or like parts. The drawings are in simplified form, not to scale, and omit apparatus elements and method steps that can be added to the described systems and methods, while including certain optional elements and steps. For purposes of convenience and clarity only, directional terms, such as top, bottom, left, right, up, down, over, above, below, beneath, rear, and front may be used with respect to the accompanying drawings. These and similar directional terms should not be construed to limit the scope of the invention in any manner.

Referring more particularly to the drawings, FIG. 1 is a high-level flow chart of selected steps of a process 100 for detecting a period of silence and terminating voice recording (or performing another function) when silence is detected. Among other uses, implementation of the process 100 in a telephone answering system can improve a caller's ability to use a voice-activated voice mail system from a noisy environment in a hands-free mode. The telephone answering system identifies when the caller has stopped speaking, and hangs up automatically.

The process begins at step 110 with receiving coded audio blocks from the system's module responsible for digitizing and coding incoming sound. In one exemplary embodiment of the system, the blocks are generated by a computer telephony subsystem card, such as the BRI/PCI series cards, available from Intel Corporation, 2200 Mission College Blvd., Santa Clara, Calif. 95052, (800) 628-8686. In this embodiment, the blocks are 1,536 one-byte samples in length, generated at a rate of 8,000 samples per second. Thus, each block is 192 milliseconds in duration.

At step 115, each block is segmented into windows. In the illustrated embodiment, each window is also 1,536 bytes in length. In one variant, the windows overlap by 160 bytes. Thus, there is about a 10 percent overlap between consecutive windows. The overlap is not strictly necessary, but it provides better handling of audio events occurring close to borderline of a particular window, and of events that would span two consecutive non-overlapping windows. In variants of the illustrated embodiment, the overlap ranges from about 2 percent to about 20 percent; in more specific variants, the overlap ranges between about 4 percent and about 12 percent.

In one alternative embodiment, the windows do not overlap.

The windows are sent to a classifier engine, at step 120. The classifier engine examines the audio data of the windows to determine whether the sound within a particular window is likely to be speech, silence, or noise. In effect, the classifier engine 120 acts as a speech versus non-speech (non-voice) discriminator.

Note that if the windows do not overlap and are the same length as the blocks, the segmentation step is essentially obviated or merged with the following step 120.

At step 125, output of the classifier engine is received. At step 130, the output of the classifier engine is evaluated. In some embodiments, the evaluation process is relatively uninvolved, particularly if the classifier engine output is a simple yes/no classification of the window; in other embodiments, the classifier output is subject to interpretation, which is carried out in this step 130. For example, the classifier engine can return a value corresponding to the energy level of the signal within the window, a number or rate of zero-crossings in the window, and a classification tag. In this case, the numerical output of the classifier engine can be evaluated or interpreted within a context dependent on the classification tag received. According to one alternative, the two numbers and the classification tag returned by the classifier engine can be evaluated together, for example, by attaching a third number to the classification tag received, weighting the three numbers in an appropriate manner, combining (e.g., adding) the three numbers, and comparing the result to one or more thresholds. In one variant of the illustrated process, the energy level output of the classifier engine is compared to a predefined threshold, while the zero-crossing output is practically ignored. In another variant, the zero-crossing number or rate is compared to a threshold, with little or no significance attached to the energy level.

In yet another variant, classification also includes comparison of the energy level and zero-crossing rate (or number) to bounded ranges. For example, the zero-crossing output of the classifier engine is compared to a range bounded by a set of two real numbers (HFZCLow, HFZCHigh), while the energy level output is compared to another set of two real numbers (HFELow, HFEHigh). The window is then classified as noise if the zero-crossing and energy level outputs fall within their respective bounded ranges. The bounded ranges test can also be applied in context of the classification of the window by the classifier engine. Using the "endpointer" classifier engine discussed below, the bounded ranges test may be applied when the classifier engine tags the window with a SIGNAL tag (which is discussed below in relation to the "endpointer" algorithm.

If voiced speech is detected in the window being processed, a speech count accumulator is incremented, at step 140. The value held by the speech count accumulator is then compared a predetermined limit L1, at step 145. If the value in the speech count accumulator is equal to or exceeds L1, then both accumulators are cleared and process flow turns to processing the next window. If the speech count accumulator does not exceed the L1 limit, process flow turns to the next window without clearing the speech count and non-voice count accumulators.

In one variant of the illustrated embodiment, L1 is set to seven. This corresponds to a time period about $$1.3 \text{ seconds} \left(\frac{1536 \text{ samples/block}}{8000 \text{ samples/sec}} * 7 \text{ blocks} = 1.344 \text{ sec}\right).$$

Note that the seven windows of speech need not occur consecutively for the accumulators to be cleared; it suffices if the seven windows accumulate before end-of-speech is detected.

In some variants of this process, L1 is set to correspond to a time period between about 0.7 and about 2.5 seconds. In more specific variants, L1 corresponds to time periods between about 1 and about 1.8 seconds. In yet more specific variants, L1 corresponds to time periods between about 1 and about 1.5 seconds.

If speech is not detected within the currently-processed window, a non-voice count accumulator is incremented, at step 155. The non-voice count accumulator is then compared to a second limit L2, at step 160. If the value in the non-voice count accumulator is less than L2, process flow once again turns to processing the next window of coded speech, at step 120. Otherwise, a command to terminate recording is issued at step 165. In alternative embodiments, step 165 corresponds to other functions. For example, and end-of-speech can be marked within the audio stream to delimit an audio section, which can then be sent to a speech recognizer, i.e., a speech recognition device or process.

In one variant of the illustrated embodiment, L2 is set to 15 windows, corresponding to about 3 seconds. In some variants of the illustrated embodiment, L2 corresponds to a time period between about 1 second and about 4 seconds. In more specific variants, L2 corresponds to time periods between about 2.5 and about 3.5 seconds.

The classifier engine used in the embodiment illustrated in FIG. 1 is an "endpointer" (or "endpoint") algorithm published by Bruce T. Lowerre. The algorithm, available at ftp://svr-ftp.eng.cam.ac.uk/pub/comp.speech/tools/ep.1.0.tar.gz, is filed together with this document and is hereby incorporated by reference as if fully set forth herein. The endpointer algorithm examines both energy content of the signal in the window, and zero-crossings of the signal. The inventive process 100 works by attaching a state machine to the basic methods of the endpointer algorithm for detection of speech, silence, and noise.

The endpointer algorithm analyzes segments of audio in 192 millisecond windows, using zero-crossing and energy detection calculations to produce an intermediate classification tag of each window, given the classification of the preceding window. The set of window classification tags generated by the endpointer algorithm includes the following:

(1) SILENCE, (2) SIGNAL, (3) IN_UTTERANCE, (4) CONTINUE_UTTERANCE, and (5) END_UTTERANCE_FINAL. The state machine uses higher-level energy and zero-crossing thresholds for making a speech-versus-silence-versus-noise determination, using the output generated by the endpointer algorithm. By taking the classification of each audio window, a non-voice accumulator or a speech count accumulator is either incremented, cleared, or left in its previous state. When the non-voice accumulator reaches the required threshold (L2) indicating that the maximum number of silence or noise windows has been detected, message recording is automatically stopped.

Figure 2:
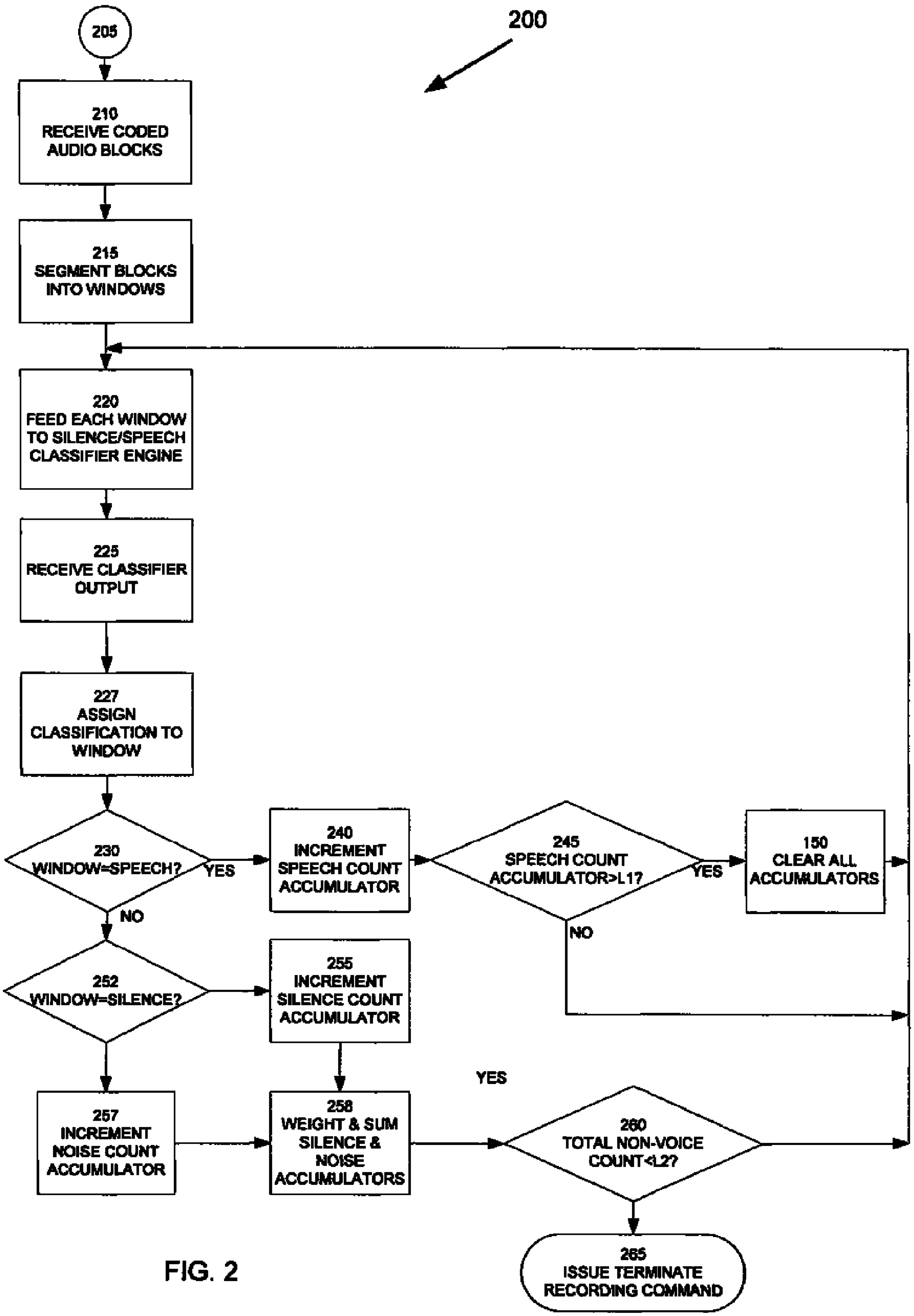
FIG. 2 is a high-level flow chart of selected steps of another process for identifying a period of silence within an audio stream and terminating voice recording, in accordance with the present invention.

Note that the classifier engine provides sufficient information to make distinctions within the various windows that fall within the non-voice classification. For example, these windows can be subdivided into silence windows and noise windows, and the state machine algorithm can be modified to assign different weights to the silence and noise windows, or to associate different thresholds with these windows. FIG. 2 illustrates selected steps of a process 200 that employs the former approach.

In the process 200, steps 210, 215, and 220 are similar or identical to the like-numbered steps of the process 100: audio blocks are received, segmented into windows, and the windows are sent to the classifier engine. At step 225, the output corresponding to each window is received from the classifier engine. Window classifications are determined at step 227, based on the output of the classifier engine. Here, each window is classified in one of three categories: speech, silence, or noise. If the window is classified as speech, the speech count accumulator is incremented at step 240, and the value of the speech count accumulator is tested against the limit L1, at step 245. As in the process 100, all accumulators are cleared once the value in the speech count accumulator exceeds L1, and process flow turns to processing the next window. If the value in the speech count accumulator does not exceed L1, process flow turns to the next window without clearing the accumulators.

If the currently-processed window is not classified as speech, it is tested to determine whether the window has been classified as silence, at step 252. In case of silence, a silence count accumulator is incremented, at step 255. If the window has not been classified as silence, it is a noise window. In this case, a noise count accumulator is incremented, at step 257. The silence and noise count accumulators are then appropriately weighted and summed to obtain the total non-voice count, at step 258. In one variant of the process 200, the weighting factor assigned to the noise windows is half the weighting factor assigned to silence windows. Thus, the total non-voice count is equal to (N1+N2/2), where N1 denotes the silence count accumulator value, and N2 denotes the noise count accumulator value. In other variants, the weighting factor assigned to the noise windows varies between about 30 and about 80 percent of the weighting factor assigned to the silence windows. The total non-voice count is next compared to the limit L2, at step 160. If the total non-voice count is less than L2, process flow proceeds to the next window. Otherwise, a command to terminate recording is issued at step 265.

Note that if the weighting factors for the silence and noise windows are both the same and equal to one, the process 200 becomes essentially the same as the process 100.

Turning now to the code in the computer program listing appendix and code of the endpointer algorithm used in certain embodiments of the processes 100 and 200, several observations may help the reader's understanding of the operation and functionality of these processes. A person skilled in the art would of course be well advised to turn to the actual code for better and more precise understanding of its operation.

The state machine implemented in the code has different Boolean modes, such as a mode determined by an END_MODE tag. The tag together with its corresponding mode can be either true or false.

Three counters are maintained by the code: (1) a speech counter, (2) a silence counter, and (3) a noise-counter; these counters implement the speech, silence, and noise count accumulators described above.

Three threshold sets of {zero-crossing, energy} parameter combinations are used by the code, to wit: noise-threshold, silence-threshold, and speech-threshold. The noise-threshold is used to determine when the currently-processed window is noise. The silence-threshold is used to determine silence in END_MODE, and when silence is otherwise observed. The speech-threshold is used to determine when the window contains speech.

When the currently-processed window is classified as SIGNAL by the classifier engine, and values computed for the {zero-crossing, energy} parameter combination are greater than the speech-threshold, a speech-counter is incremented. When a predetermined number of speech windows is encountered (as determined by observing the speech-counter), both the silence-counter and the noise-counter are reset.

When the state machine is in END_MODE, the currently-processed window has been classified as SIGNAL, and the values computed for the {zero-crossing, energy} parameter combination are less than a silence-threshold, the silence-counter is incremented.

When the state machine observes SILENCE returned by the classifier engine and the energy parameter is less than the silence energy-threshold, the silence-counter is incremented.

When the state machine observes a CONTINUE_UTTERANCE return from the classifier engine, the silence-counter and noise-counter are cleared, unless the current {zero-crossing, energy} parameters are less than the silence-threshold set.

After each window of audio is classified, the current values in the noise and silence counters are observed, and if the values exceed the pre-configured time-based threshold for maximum combined silence and noise periods, the recording is terminated.

Figure 3:
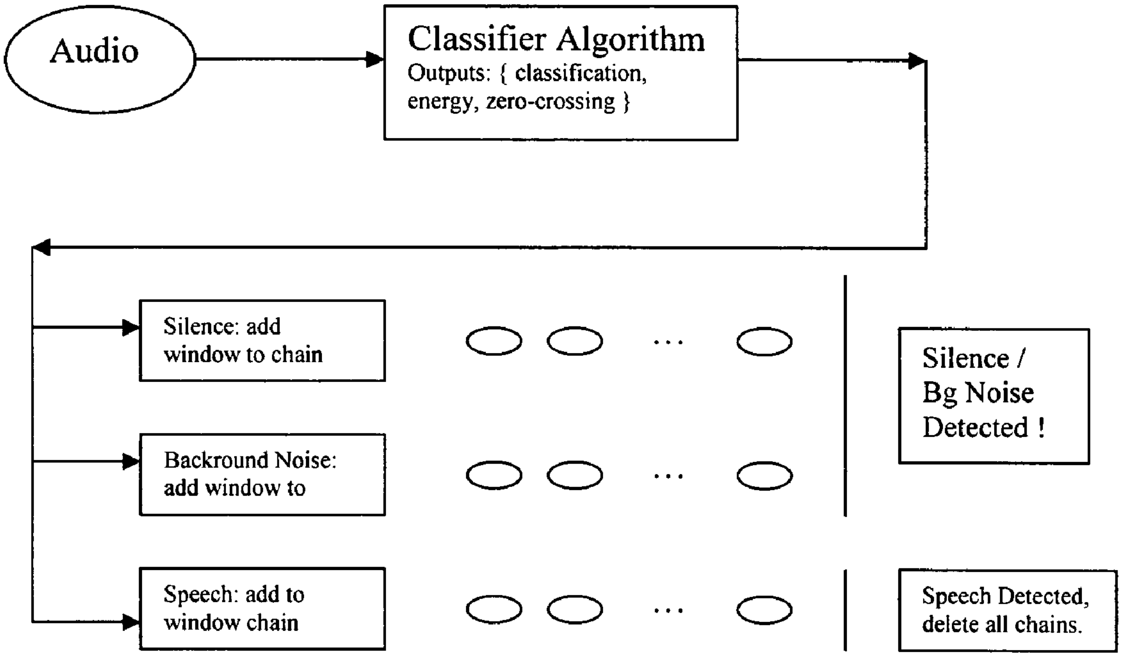
FIG. 3 illustrates a simplified visual model of operation of a state machine as audio blocks are classified using a process for identifying periods of speech, silence, and noise, in accordance with the present invention.

To facilitate understanding of the code further, FIG. 3 illustrates a simplified visual "chain" model of the operation of the state machine when audio windows are classified. As each audio window is classified, the window is added to one of three classification chains: speech chain, silence chain, or noise chain. All chains are cleared when the number of speech windows received exceeds a first predetermined number (L1), i.e., when the speech chain exceeds L1 windows. The window classification process then continues, allowing the chains to grow once again. If the combination of the silence and noise chains reaches a second predetermined number (L2), then the end-of-speech command is issued and recording is terminated.

In alternative embodiments in accordance with the invention, different classifier engines are used, including classifier engines that examine various attributes of the signal instead of or in addition to the energy and zero-crossing attributes. For example, classifier engines in accordance with the present invention can discriminate between silence and speech using high-order statistics of the signal; or an algorithm promulgated in ITU G.729 Annex B standard, entitled A SILENCE COMPRESSION SCHEME FOR G.729 OPTIMIZED FOR TERMINALS CONFORMING TO RECOMMENDATION V.70, incorporated herein by reference. Although digital, software-driven classifier engines have been described above, digital hardware-based and analogue techniques can be employed to classify the windows. Generally, there is no requirement that the classifier engine be limited to using any particular attribute or a particular combination of attributes of the signal, or a specific technique.

Figure 4:
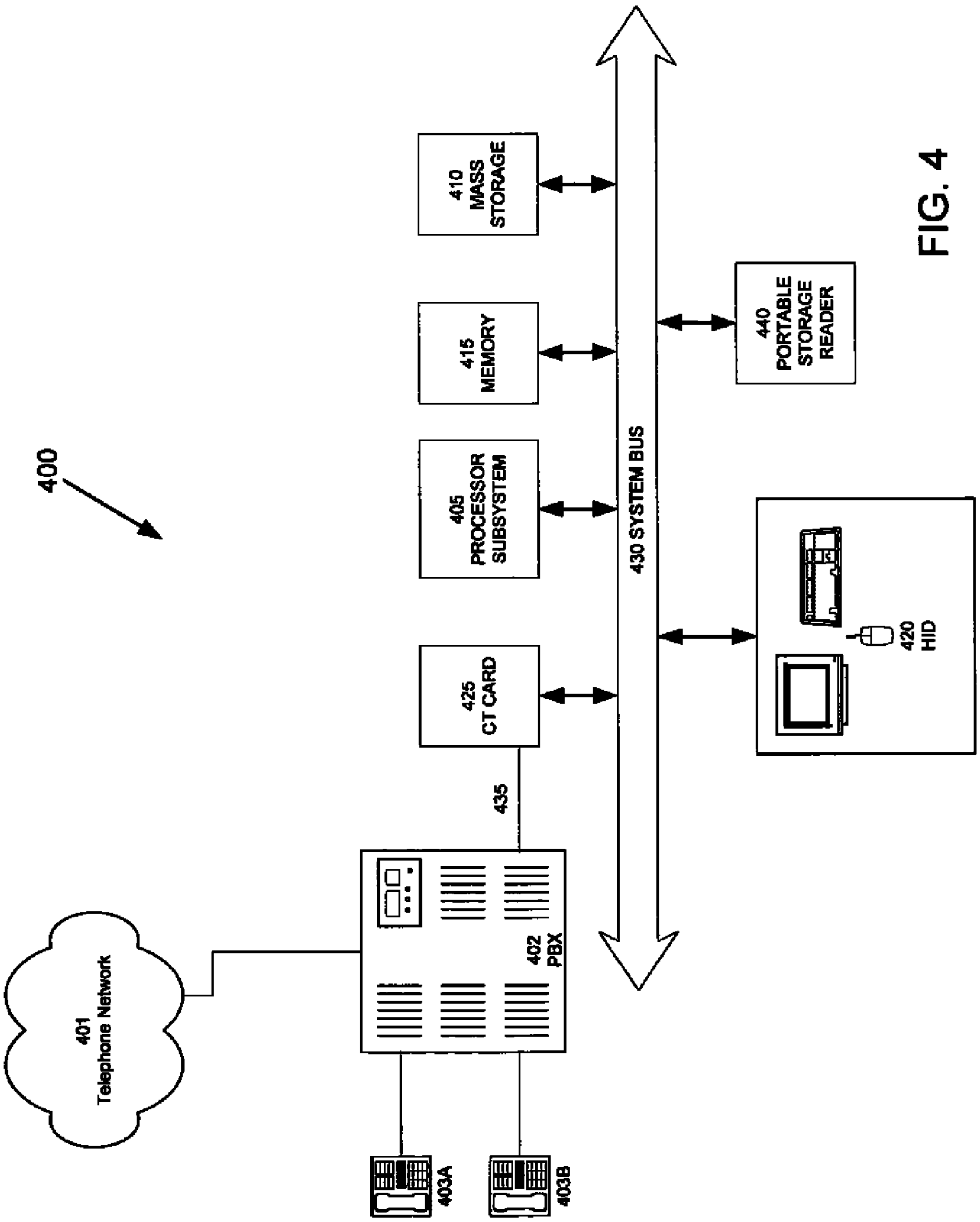
FIG. 4 illustrates selected blocks of a computer system capable of being configured by program code to perform steps of a process for identifying a period of silence within an audio stream, in accordance with the present invention.

Processes in accordance with the present invention can be practiced on both dedicated hardware and general purpose computing systems controlled by custom program code. FIG. 4 illustrates selected blocks of a general-purpose computer system 400 capable of being configured by such code to perform the process steps in accordance with the invention. In various embodiments, the general purpose computer 400 can be a Wintel machine, an Apple machine, a Unix/Linux machine, or a custom-built computer. Note that some processes in accordance with the invention can run in real time, on a generic processor (e.g., an Intel '386), and within a multitasking environment where the processor performs additional tasks.

At the heart of the computer 400 lies a processor subsystem 405, which may include a processor, a cache, a bus controller, and other devices commonly present in processor subsystems. The computer 400 further includes a human interface device 420 that allows a person to control operations of the computer. Typically, the human interface device 420 includes a display, a keyboard, and a pointing device, such as a mouse. A memory subsystem 415 is used by the processor subsystem to store the program code during execution, and to store intermediate results that are too bulky for the cache. The memory subsystem 415 can also be used to store digitized voice mail messages prior to transfer of the messages to a mass storage device 410. A computer telephony (CT) subsystem card 425 and a connection 435 tie the computer 400 to a private branch exchange (PBX) 402. The CT card 425 can be an Intel (Dialogic) card such as has already been described above. The PBX 402 is in turn connected to a telephone network 401, for example, a public switched telephone network (PSTN), from which the voice mail messages stored by the computer 400 originate.

The program code is initially transferred to the memory subsystem 415 or to the mass storage device 410 from a portable storage unit 440, which can be a CD drive, a DVD drive, a floppy disk drive, a flash memory reader, or another device used for loading program code into a computer. Prior to transfer of the program code to the computer 400, the code can be embodied on a suitable medium capable of being read by the portable storage unit 440. For example, the program code can be embodied on a hard drive, a floppy diskette, a CD, a DVD, or any other machine-readable storage medium. Alternatively, the program code can be downloaded to the computer 400, for example, from the Internet, an extranet, an intranet, or another network using a communication device, such as a modem or a network card. (The communication device is not illustrated in FIG. 4.) Finally, a bus 430 provides a communication channel that connects the various components of the computer 400.

In operation, the PBX 402 receives telephone calls from the telephone network 401 and channels them to appropriate telephone extensions 403. When a particular telephone call is unanswered for a preprogrammed number of rings, the PBX 402 plays a message to the caller, optionally providing the caller with various choices for proceeding. If the caller chooses to leave a message, the call is connected to the CT card 425, which digitizes the audio signal received from the caller and hands the digitized audio to the processor subsystem 405 in blocks, for example, blocks of 1,536 samples (bytes). The processor subsystem 405, which is executing the program code, segments the blocks into windows and writes the windows to the mass storage device 415. At the same time, the processor subsystem 405 monitors the windows as has been described above with reference to the processes 100 and 200. When the combination of silence and noise count accumulators reaches a critical value (L2), the processor subsystem 405 issues terminate recording commands to the CT card 425 and to the PBX 402, and stops recording the windows to the mass storage device 410. Upon receipt of the terminate recording command, the PBX 402 and the CT card 425 drop the telephone call, disconnecting the caller.

The invention can also be practiced in a networked, client/server environment, with the computer 400 being integrated within a networked computer configured to receive, route, answer, and record calls, e.g., within an integrated PBX, telephone server, or audio processor device.

It should be understood that FIG. 4 illustrates many components that are not necessary for performing the processes in accordance with the invention. For example, the inventive processes can be practiced on an appliance-type of computer that boots up and runs the code, without direct user control, interfacing only with a computer telephony subsystem.

The above is of course a greatly simplified description of the operation of the hardware that can be used to practice the invention, but a person skilled in the art will no doubt be able to fill-in the details of the configuration and operation of both the hardware and software.

This document describes the inventive apparatus, methods, and articles of manufacture for detecting silence in considerable detail for illustration purposes only. Neither the specific embodiments and methods of the invention as a whole, nor those of its features limit the general principles underlying the invention. The specific features described herein may be used in some embodiments, but not in others, without departure from the spirit and scope of the invention as set forth. Various physical arrangements of components and various step sequences also fall within the intended scope of the invention. The invention is not limited to the use of specific components, such as the computer telephony cards mentioned above. Furthermore, in the description and the appended claims the words "couple," "connect," and similar expressions with their inflectional morphemes do not necessarily import an immediate or direct connection, but include connections through mediate elements within their meaning. It should also be noted that, as used in this document, the words "counter" and "accumulator" have similar meanings. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is carried out by the claims and their equivalents.

I claim:

1. A method of identifying end-of-speech within an audio stream, comprising:

analyzing each window of the audio stream in a speech discriminator;

assigning a classification to said each window based on speech discriminator output corresponding to said each window, the classification being selected from a classification set comprising a first classification label corresponding to presence of speech within said each window, a second classification label corresponding to silence within said each window, and a third classification label corresponding to noise in said each window;

incrementing a speech counter when said each window is assigned the first classification label;

incrementing a silence counter when said each window is assigned the second classification label;

incrementing a noise counter when said each window is assigned the third classification label;

clearing the speech counter, the silence counter, and the noise counter when the speech counter exceeds a first limit;

weighting at least one of the silence counter and the noise counter to obtain weighted silence and noise values;

combining the weighted silence and noise values in a result;

comparing the result to a second limit; and identifying end-of-speech within the audio stream when the non-voice counter reaches a second limit;

wherein the steps of analyzing, assigning, incrementing a speech counter, incrementing a silence counter, incrementing a noise counter, clearing, weighting, combining, comparing, and identifying are performed by at least one processor.

2. A method according to claim 1, further comprising terminating recording of the audio stream when end-of-speech is identified.

3. A method according to claim 1, further comprising terminating processing of the audio stream when end-of-speech is identified.

4. A method according to claim 1, further comprising delimiting end of an audio section within the audio stream when end-of-speech is identified to obtain a delimited audio section.

5. A method according to claim 4, further comprising processing the audio section using a speech recognizer.

6. A method according to claim 4, further comprising segmenting the audio stream into the windows.

7. A method according to claim 6, further comprising:

digitizing the audio stream to obtain a digitized audio stream; and dividing the digitized audio stream into digitized blocks;

wherein the step of dividing is performed prior to the step of segmenting and the step of segmenting comprises a step of segmenting the digitized blocks.

8. A method according to claim 7, wherein the windows are overlapping and the step of segmenting the digitized blocks comprises segmenting the digitized blocks into the overlapping windows.

9. A method according to claim 6, wherein the windows are overlapping and the step of segmenting comprises segmenting the audio stream into the overlapping windows.

10. A method according to claim 9, wherein the first limit corresponds to a time period between 0.7 and 2.5 seconds.

11. A method according to claim 9, wherein said step of analyzing comprises observing energy content of sound in said each window.

12. A method according to claim 11, wherein said step of observing energy content comprises comparing broadband energy content of the sound in said each window to a first sound energy threshold.

13. A method according to claim 11, wherein said step of observing energy content comprises comparing band-limited energy content of the sound in said each window to a first sound energy threshold.

14. A method according to claim 9, wherein said step of analyzing comprises observing zero crossings of the sound in said each window.

15. A method according to claim 14, wherein said step of observing comprises determining zero-crossing rate of the sound in said each window.

16. A method according to claim 14, wherein said step of observing comprises determining number of zero crossings of the sound in said each window.

17. A method according to claim 14, wherein said step of analyzing further comprises observing energy content of the sound in said each window.

18. A method according to claim 14, wherein said step of analyzing further comprises comparing band-limited energy content of the sound in said each block to a first sound energy threshold.

19. A method according to claim 9, wherein said step of weighting comprises weighting the silence counter at about two times rate of weighting the noise counter.

20. A method according to claim 4, wherein:

the audio stream comprises sound of a voice mail message; and said step of receiving comprises receiving the audio stream in digitized blocks from a computer telephony hoard.

21. A method of identifying end-of-speech within an audio stream, comprising:

step for analyzing each window of the audio stream in a speech discriminator;

step for assigning a classification to said each window based on speech discriminator output corresponding to said each window, the classification being selected from a classification set comprising a first classification label corresponding to presence of speech within said each window, a second classification label corresponding to silence within said each window, and a third classification label corresponding to noise in said each window;

incrementing a speech counter in response to said each window being assigned the first classification label;

incrementing a silence counter in response to said each window being assigned the second classification label;

incrementing a noise counter in response to said each window being assigned the third classification label;

step for determining when the speech counter exceeds a first limit;

clearing the speech counter, the silence counter, and the noise counter in response to the speech counter exceeds a first limit;

step for weighting at least one of the silence counter and the noise counter to obtain weighted silence and noise values;

step for combining the weighted silence and noise values in a result;

step for comparing the result to a second limit; and step for identifying end-of-speech within the audio stream in response to the result reaching the second limit;

wherein the steps for analyzing, assigning are performed by at least one processor.

22. A method according to claim 21, further comprising delimiting end of an audio section within the audio stream when end-of-speech is identified to obtain a delimited audio section.

23. Apparatus for processing an audio stream, comprising:

a memory storing program code; and a digital processor under control of the program code;

wherein the program code comprises;

instructions to cause the processor to receive the audio stream in digitized blocks;

instructions to segment the digitized blocks into windows;

instructions to cause the processor to analyze each window in a speech discriminator;

instructions to cause the processor to assign a classification to said each window based on speech discriminator output corresponding to said each window, the classification being selected from a classification set comprising a first classification label corresponding to presence of speech within said each window, a second classification label corresponding, to silence in said each window, and a third classification label corresponding to noise in said each window;

instructions to cause the processor to increment a speech counter in response to said each window being assigned the first classification label:

instructions to cause the processor to increment a silence counter in response to said each window being assigned the second classification label;

instructions to cause the processor to increment a noise counter in response to said each window being assigned the third classification label;

instructions to cause the processor to clear the speech counter, the silence counter, and the noise counter in response to the speech counter exceeding a first limit;

instructions to cause the processor to weight at least one of the silence counter and the noise counter to obtain weighted silence and noise values;

instructions to cause the processor to combine the weighted silence and noise values in a result;

instructions to cause the processor to compare the result to a second limit; and instructions to cause the processor to identify end-of-speech within the audio stream in response to the result reaching the second limit.

24. Apparatus according to claim 23, further comprising a mass storage device, wherein:

the code further comprises instructions to cause the processor to record the audio stream on the mass storage device, and the code further comprises instructions to cause the processor to terminate recording of the audio stream when end-of-speech is identified.

25. Apparatus according to claim 23, wherein the code further comprises instructions to cause the processor to terminate processing of the audio stream when end-of-speech is identified.

26. Apparatus according to claim 23, further comprising a computer telephony subsystem capable of sending the digitized blocks to the processor.

27. Apparatus according to claim 23, wherein the program code further comprises instructions to cause the processor to delimit end of an audio section within the audio stream when end-of-speech is identified to obtain a delimited audio section, and to process the digitized audio section using a speech recognizer.

* * * * *

UNITED STATES PATENT AND TRADEMARK OFFICE

CERTIFICATE OF CORRECTION

PATENT NO. : 7,756,709 B2
APPLICATION NO. : 10/770748
DATED : July 13, 2010
INVENTOR(S) : Karl D. Gierach It is certified that error appears in the above-identified patent and that said Letters Patent is hereby corrected as shown below:

Column 10, line 59, cancel "the non-voice counter reaches a second limit" and replace the cancelled text with --the result reaches the second limit--;

Column 12, lines 18-19, cancel "exceeds a first limit" and replace the cancelled text with --exceeding the first limit--;

Column 12, line 37, cancel "comprises;" and replace the cancelled text with --comprises:--;

Column 12, line 50, cancel "corresponding," and replace the cancelled text with --corresponding--;

Column 12, line 55, cancel "label:" and replace the cancelled text with --label;--.

Signed and Sealed this
Thirty-first Day of May, 2011

David J. Kappos
*Director of the United States Patent and Trademark Office*